(12) United States Patent
Han (10) Patent No.: US 9,600,040 B1
(45) Date of Patent: Mar. 21, 2017

(54) INTERFACE CARD ADAPTING DEVICE AND METHOD THEREOF

(71) Applicant: EVGA CORPORATION, New Taipei (TW)

(72) Inventor: Tai-Sheng Han, New Taipei (TW)

(73) Assignee: EVGA CORPORATION, New Taipei (TW)

( * ) Notice: Subject to any disclaimer, the term of this patent is extended or adjusted under 35 U.S.C. 154(b) by 0 days.

(21) Appl. No.: 14/881,165

(22) Filed: Oct. 13, 2015

(51) Int. Cl.
*G06F 1/20* (2006.01)
*G06F 1/18* (2006.01)

(52) U.S. Cl.
CPC ............... *G06F 1/20* (2013.01); *G06F 1/183* (2013.01)

(58) Field of Classification Search
None
See application file for complete search history.

(56) References Cited

U.S. PATENT DOCUMENTS

| | | | | |
|---|---|---|---|---|
| 5,889,850 A * | 3/1999 | Sochacki | ............ | H04M 3/005 379/329 |
| 6,125,034 A * | 9/2000 | Bovio | .................. | G06F 1/1616 361/679.32 |
| 6,128,194 A * | 10/2000 | Francis | ................ | H05K 5/0269 235/492 |
| 6,457,648 B1 * | 10/2002 | Chen | ................... | G06K 7/0004 235/449 |
| 6,908,324 B1 * | 6/2005 | Morley | .................. | H01R 31/06 439/11 |
| 8,856,417 B2 * | 10/2014 | Foster, Sr. | ............... | G06F 1/26 361/789 |
| 2010/0105228 A1 * | 4/2010 | Lai | ....................... | H01R 13/443 439/147 |
| 2010/0165573 A1 * | 7/2010 | Fang | ........................ | G06F 1/20 361/697 |
| 2012/0289073 A1 * | 11/2012 | Wu | ........................ | H01R 31/06 439/218 |
| 2013/0163490 A1 * | 6/2013 | Rodriguez | ........ | H04L 29/06387 370/310 |
| 2013/0175859 A1 * | 7/2013 | Tien | .................. | H04L 12/40045 307/11 |
| 2014/0254086 A1 * | 9/2014 | Li | ..................... | H01R 13/62944 361/679.32 |
| 2015/0070837 A1 * | 3/2015 | Hsu | .......................... | G06F 1/20 361/679.47 |

* cited by examiner

*Primary Examiner* — Xanthia C Cunningham
(74) *Attorney, Agent, or Firm* — Leong C. Lei (57) ABSTRACT

An interface card adapting device includes an adaptor body, a first adapting portion, and a second adapting portion. The adaptor body is positionable against one side of an interface card to allow the first adapting portion to connect to a power connection port, so as to have an output direction of the power connection port changed by the second adapting portion to one side that is different from the first adapting portion. Thus, the second adapting portion may take the place of the power connection port in respect of the functionality thereof. As such, the power cable can be collected at the same side, making it easy to organize the cable and also improve interior aesthetics and heat dissipation effect of an enclosure.

8 Claims, 9 Drawing Sheets

INTERFACE CARD ADAPTING DEVICE AND METHOD THEREOF

TECHNICAL FIELD OF THE INVENTION

The present invention relates generally to an interface card adapting device and a method thereof, and more particularly to an interface card adapting device and a method thereof that change an output direction of a power connection port in order to have wires properly organized inside an enclosure in a neat and aesthetic manner and also to increase the available amount of space and the effect of heat dissipation.

DESCRIPTION OF THE PRIOR ART

The increasing innovation of technology makes most of the work operations handled with the necessary assistance of computers for both individuals and companies. To provide more functions for use, the electronic components, such as central processing units (dual-core processors and four-cores processors), chipsets, and insertion cards, involved in a computer are getting increasingly complicated. The operations of these electronic components generate heat, making them the so-call "heat sources". Further, due to the increasing amount of data that is processed by the computers and the increased operation speeds of the computers, the amount of heat generated by the computers is increased correspondingly. Long-term use would results in significant accumulation of the heat inside the computer, which leads to an increase of the environment in which the electronic components are located so that the performance of the electronic components may get deteriorating or the electronic components may simply get damaged, eventually causing the computer malfunctioning.

However, there are various electronic components, including display card, network card, and hard disk drive, of which the power connection ports may be located at different sides, while a power supply device is generally located at the rear side of the computer so that electrical wires must be extended in various direction for connection and thus, the wires are randomly set inside the computer and may affect air flowing inside the computer and heat dissipation achieved thereby.

Thus, in view of the above problems and drawbacks, the present invention aims to provide a solution that overcomes the problems.

SUMMARY OF THE INVENTION

The primary object of the present invention is to have power wires arranged at the same side so that the wires that are located inside an enclosure can be arranged in an organized and aesthetic manner to increase the amount of space available inside the enclosure and to improve effect of heat dissipation.

To achieve the above object, structurally, the present invention generally comprises: an adaptor body that is arranged at one side of an interface card. The adaptor body comprises a first adapting portion for connection with a power connection port of the interface card and a second adapting portion arranged at one side of the adaptor body that is distant from the first adapting portion. When a user installs the present invention on the interface card, the adaptor body is positioned against one side of the interface card to allow the first adapting portion to connected to the power connection port of the interface card and the output direction of the power connection port is changed from one side of the first adapting portion to one side of the second adapting portion. Thus, the second adapting portion may take the place of the power connection port in respect of the functionality thereof to change the power output direction of the interface card. As such, the power cable can be collected at the same side, making it easy to organize the cable and also improve interior aesthetics and heat dissipation effect of an enclosure.

With the above-described technique, the problem of inconsistency in respect of direction of the power connection port of the interface card, which leads to wires inside a computer being not properly organized, air flowing being poor, and heat dissipation being bad as those found in the prior art devices can be overcome to effectively achieve the above-discussed advantages.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
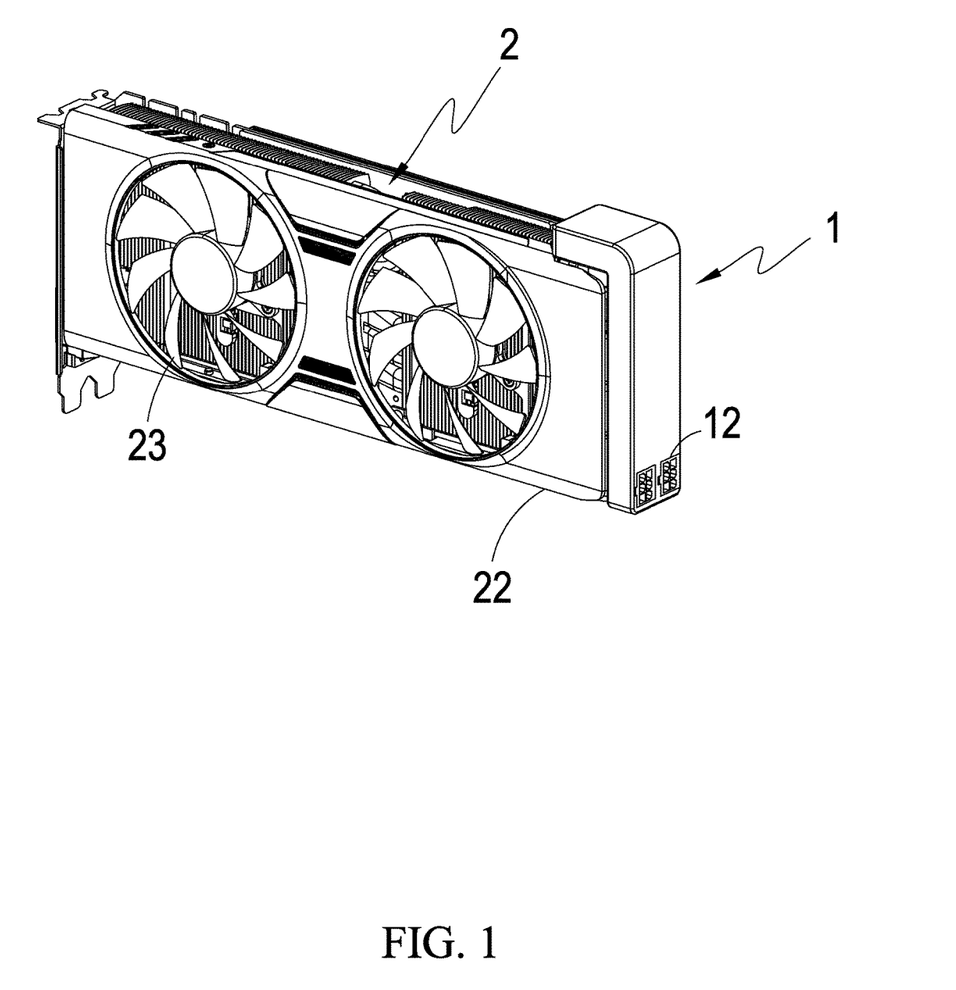
FIG. 1 is a perspective view showing a preferred embodiment of the present invention.
Figure 2:
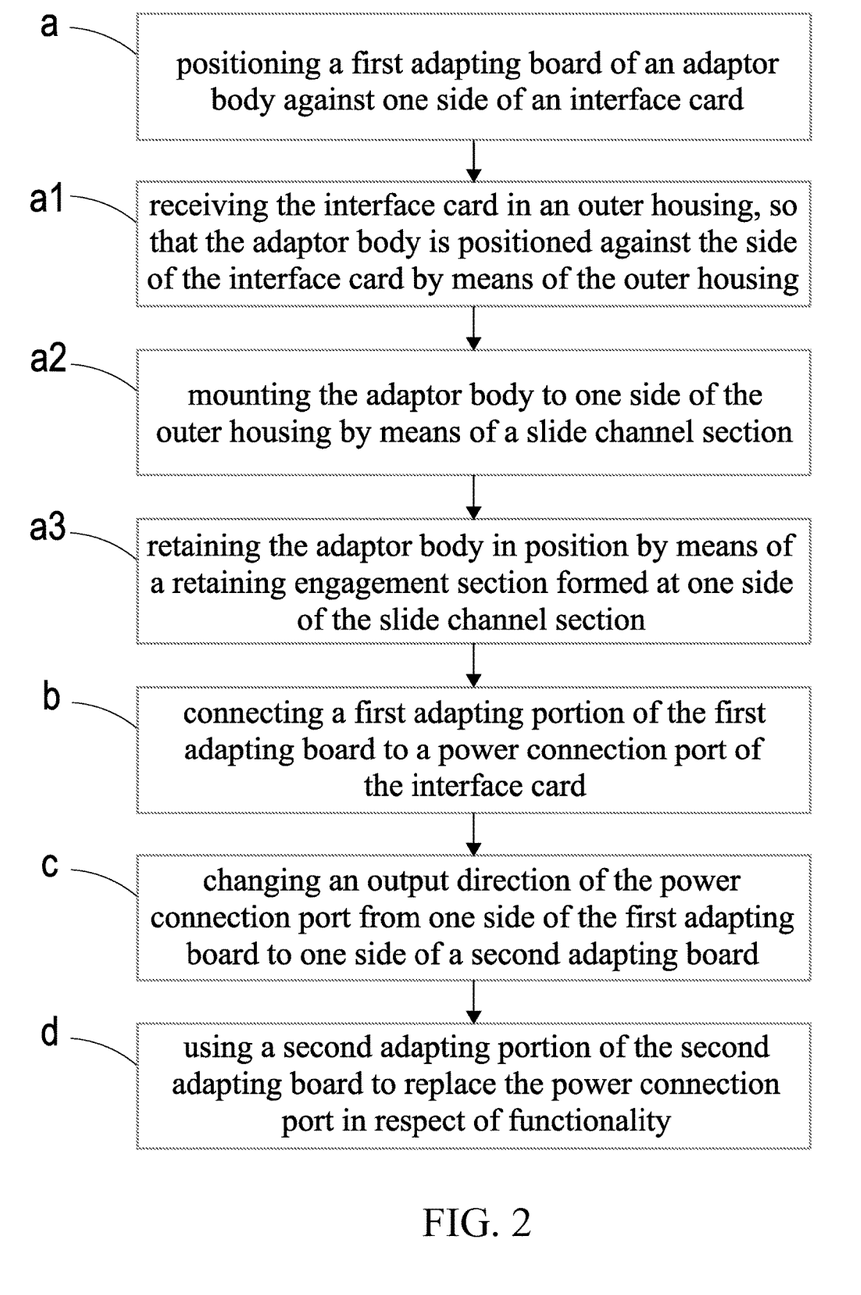
FIG. 2 is a flow chart, in a block form, illustrating the preferred embodiment of the present invention.
Figure 3:
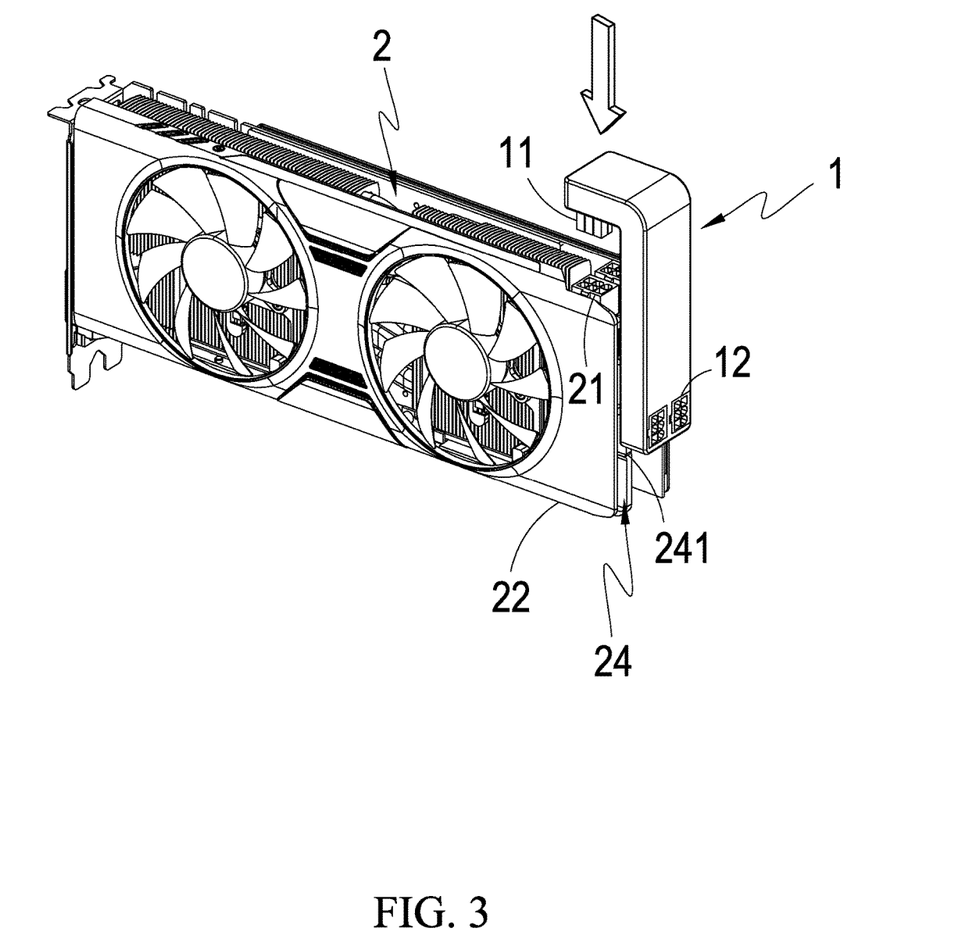
FIG. 3 is a schematic view illustrating an operation of the preferred embodiment of the present invention.
Figure 4:
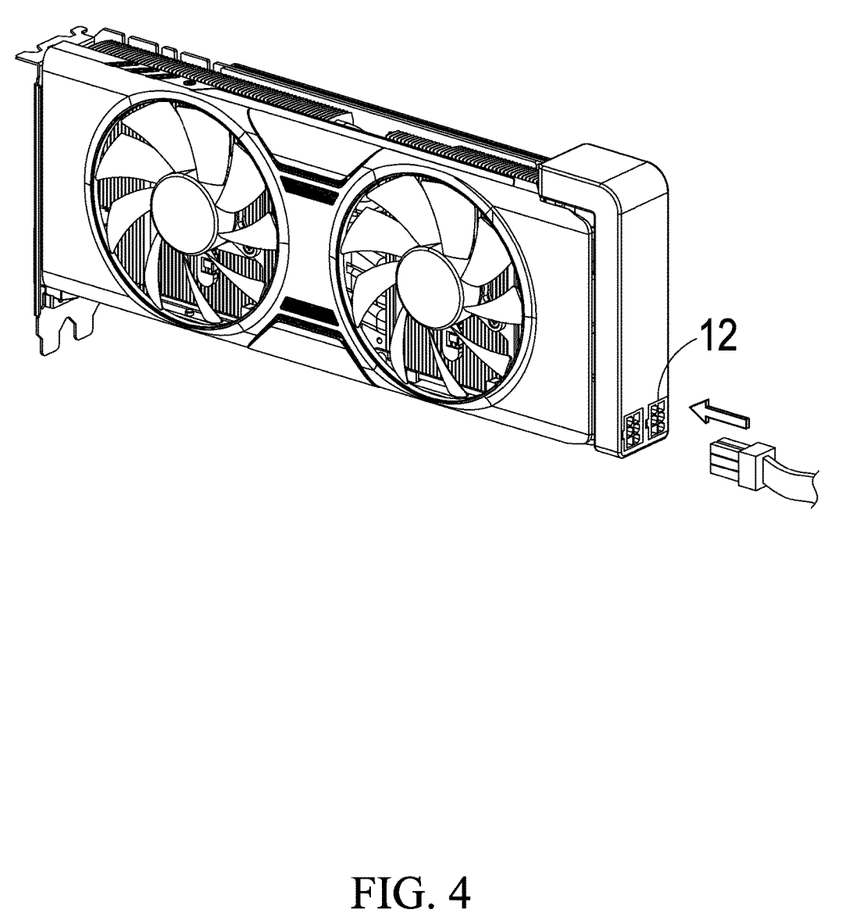
FIG. 4 is another schematic view illustrating the operation of the preferred embodiment of the present invention
Figure 5:
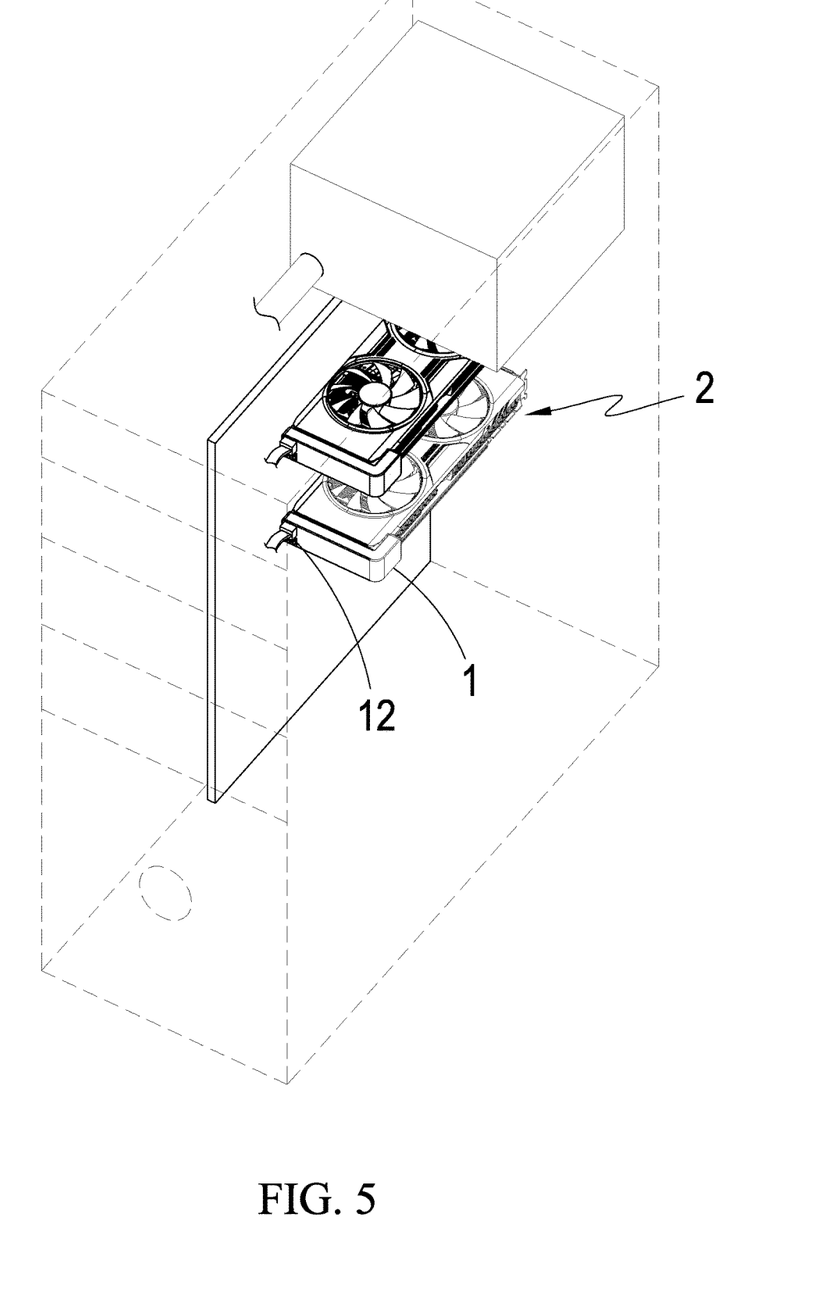
FIG. 5 is a schematic view illustrating the use of the preferred embodiment of the present invention.

Referring to FIGS. 1-3, these drawings clearly show the present invention comprises:

an adaptor body 1 that is arranged at one side of an interface card 2, wherein the adaptor body 1 has a width that is smaller than or substantially equal to a thickness of an outer housing 22 that will be further described below;

a first adapting portion 11 that is mounted to the adaptor body 1 and is connectable to a power connection port 21 of the interface card 2;

a second adapting portion 12 that is arranged on a side of the adaptor body 1 that is distant from the first adapting portion 11 for taking the place of the power connection port 21 so as to change a power output direction of the interface card 2; and an outer housing 22 that is arranged outside the interface card 2, the outer housing 22 comprising at least a heat dissipation fan 23 mounted thereto, the outer housing 22 having a side on which at least one slide channel section 24 is formed for movement of the adaptor body 1, the slide channel section 24 comprising, on one side thereof, a retaining engagement section 241 for retaining the adaptor body 1 in position.

A method for adaptation of an interface card 2 according to the present invention comprises the following steps:

(a) positioning an adaptor body 1 against one side of an interface card 2;

(a1) receiving the interface card 2 in an outer housing 22, so that the adaptor body 1 is positioned against the side of the interface card 2 by means of the outer housing 22;

(a2) mounting the adaptor body 1 to one side of the outer housing 22 by means of a slide channel section 24;

(a3) retaining the adaptor body 1 in position by means of a retaining engagement section 241 formed at one side of the slide channel section 24;

(b) connecting a first adapting portion 11 of the adaptor body 1 to a power connection port 21 of the interface card 2;

(c) arranging second adapting portion 12 of the adaptor body 1 to change an output direction of the power connection port 21 to one side that is different from the first adapting portion 11; and (d) using the second adapting portion 12 to replace the power connection port 21 in respect of functionality.

The above description provides a clear explanation of the structure of the present invention so that based on a combination achievable with such a structure, the output direction of the power connection port 21 can be changed to make electrical wires organized in a neat and aesthetic manner and also to provide advantages of increasing available amount of space and effect of heat dissipation. Further details will be provided below.

Referring to FIGS. 1-5, with the above-described components properly assembled, as clearly shown in the drawings, the present invention provides an outside configuration that is extremely simple so that the operation thereof is also easy. There is no need to remove the interface card 2 in installing the present invention and only the power cable needs to be removed from the power connection port 21 of the interface card 2. The power cable can be re-connected to the second adapting portion 12 after the installation of the adaptor body 1 to complete the operation of adaptation.

Details are as follows. After the power cable is removed from the interface card 2, the width of the outer housing 22 allows the adaptor body 1 to be easily positioned against one side of the interface card 2 and the adaptor body 1 is installed on one side of the outer housing 22 by moving along the slide channel section 24 in such a way that the first adapting portion 11 is brought into connection with the power connection port 21 of the interface card 2 and under this condition, the retaining engagement section 241 engages and thus retains the adaptor body 1 in position against additional sliding movement. The output direction of the power connection port 21 is then changed from one side of the first adapting portion 11 to one side of the second adapting portion 12 so that the second adapting portion 12 may replace the power connection port 21 in respect of functionality thereof. Finally the power cable of the interface card 2 is re-connected to the second adapting portion 12. In this way, the power cable of the interface card 2 is moved from one side of an enclosure to the back side of the enclosure and the second adapting portion 12 is set almost adjacent to a power supply device so that the power cable can be concentrated together to leave more free space at the side of the enclosure and thus help increase the flow rate of air around the interface card 2, this, when combined with the heat dissipation fan 23, further improving the heat dissipation effect of the interface card 2 and thus indirectly extending the life span of the interface card 2 and other electronic components.

Figure 6:
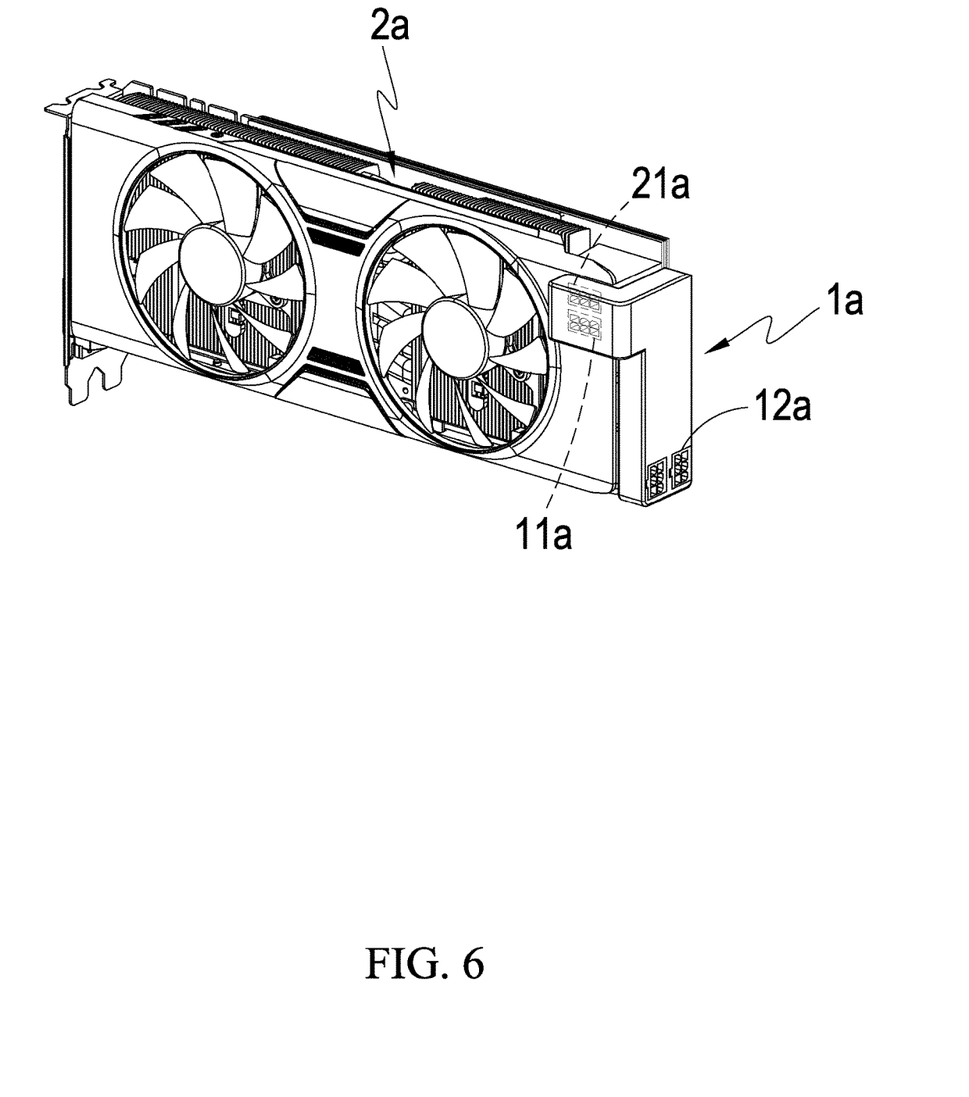
FIG. 6 is a schematic view illustrating the use of a second embodiment of the present invention.

Referring to FIG. 6, a second embodiment is provided, which is similar to the previous one, but the power connection port 21a of the interface card 2a is changed to a major surface of the interface card 2a in this embodiment so that a spatial relationship in respect to the adaptor body 1a is modified to be extended from the first adapting portion 11a that is now on the major surface of the interface card 2a to the second adapting portion 12a that is on one side of the interface card 2a. This makes it applicable to a different kind of interface card 2a.

Figure 7:
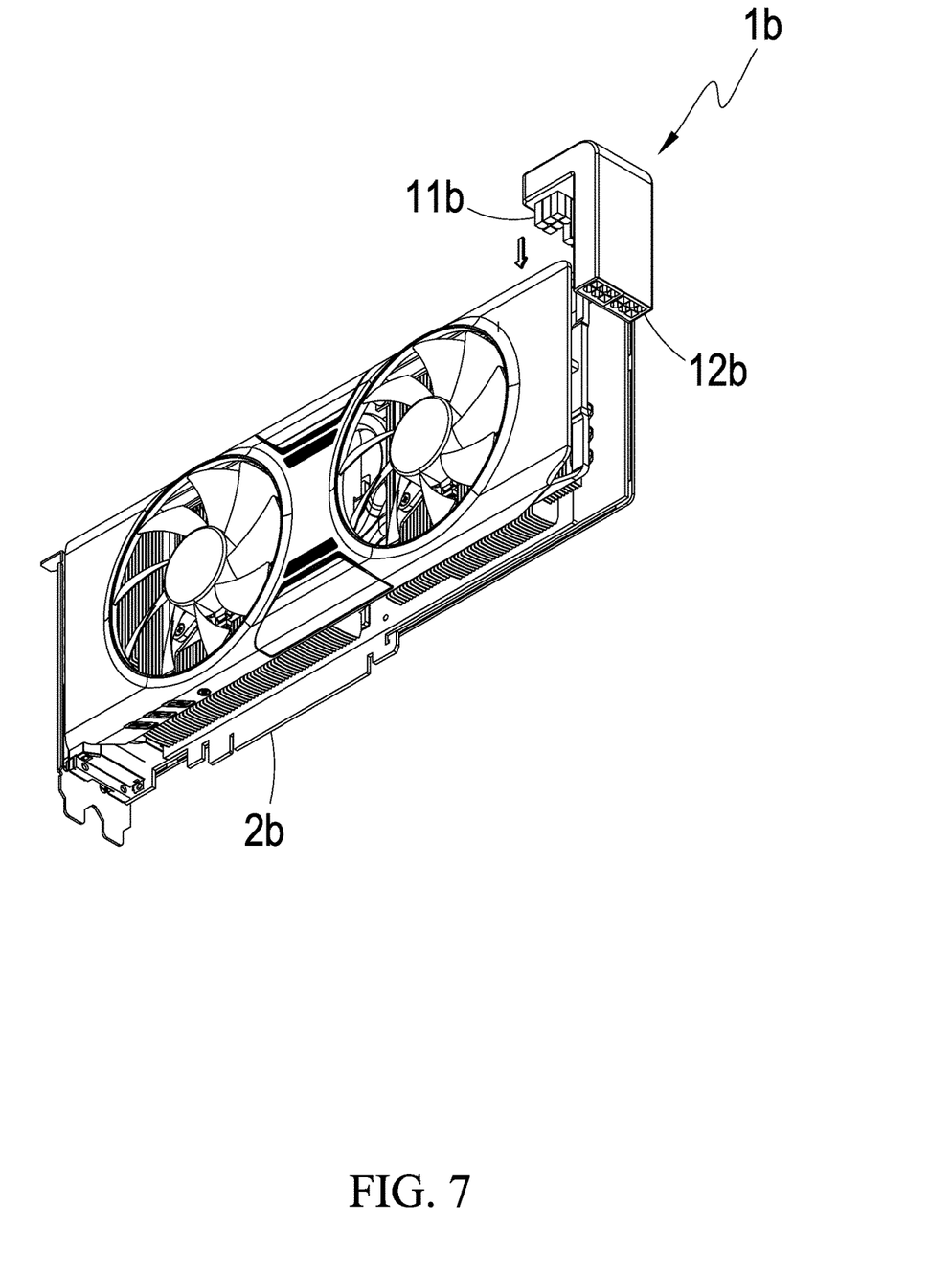
FIG. 7 is a schematic view illustrating an operation of a third embodiment of the present invention.

Referring to FIG. 7, in a third embodiment, the second adapting portion 12b is arranged at an end of the adaptor body 1b that is distant from the first adapting portion 11b so that an output direction of the second adapting portion 12b is opposite to and spaced by 180 degrees from an output direction of the first adapting portion 11b, whereby the site of connection between a power cable and the second adapting portion 12b can be set against a side wall of the interface card 2b to improve connection stability of the power cable, in addition to the advantages relating to aesthetics and space.

Figure 8:
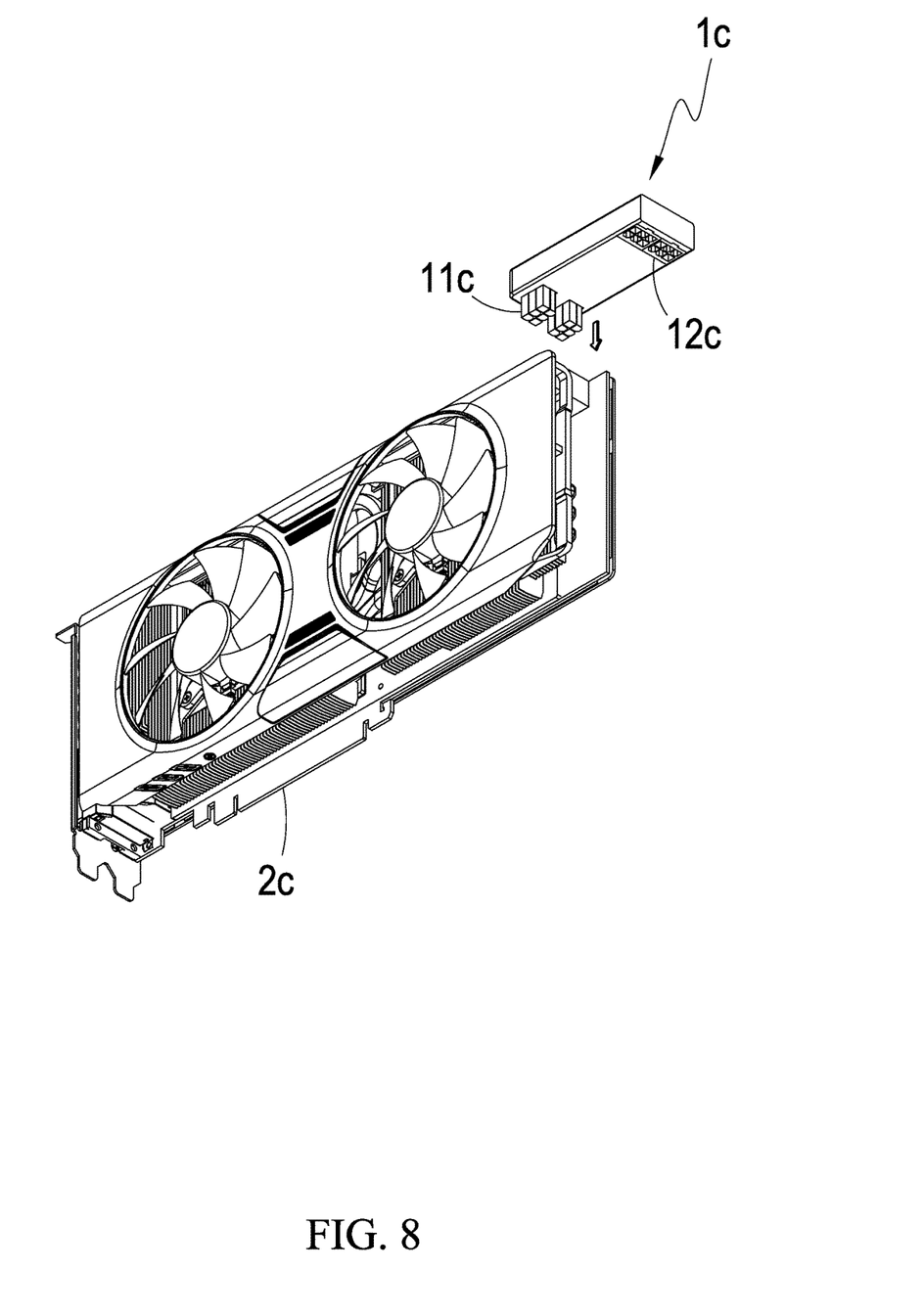
FIG. 8 is a schematic view illustrating an operation of a fourth embodiment of the present invention.

Referring to FIG. 8, in a fourth embodiment, the adaptor body 1c is provided only at one side of the interface card 2c and the spatial relationship between the first adapting portion 11c and the second adapting portion 12c is similar to the that of the third embodiment, by which the size of the adaptor body 1c can be reduced.

Figure 9:
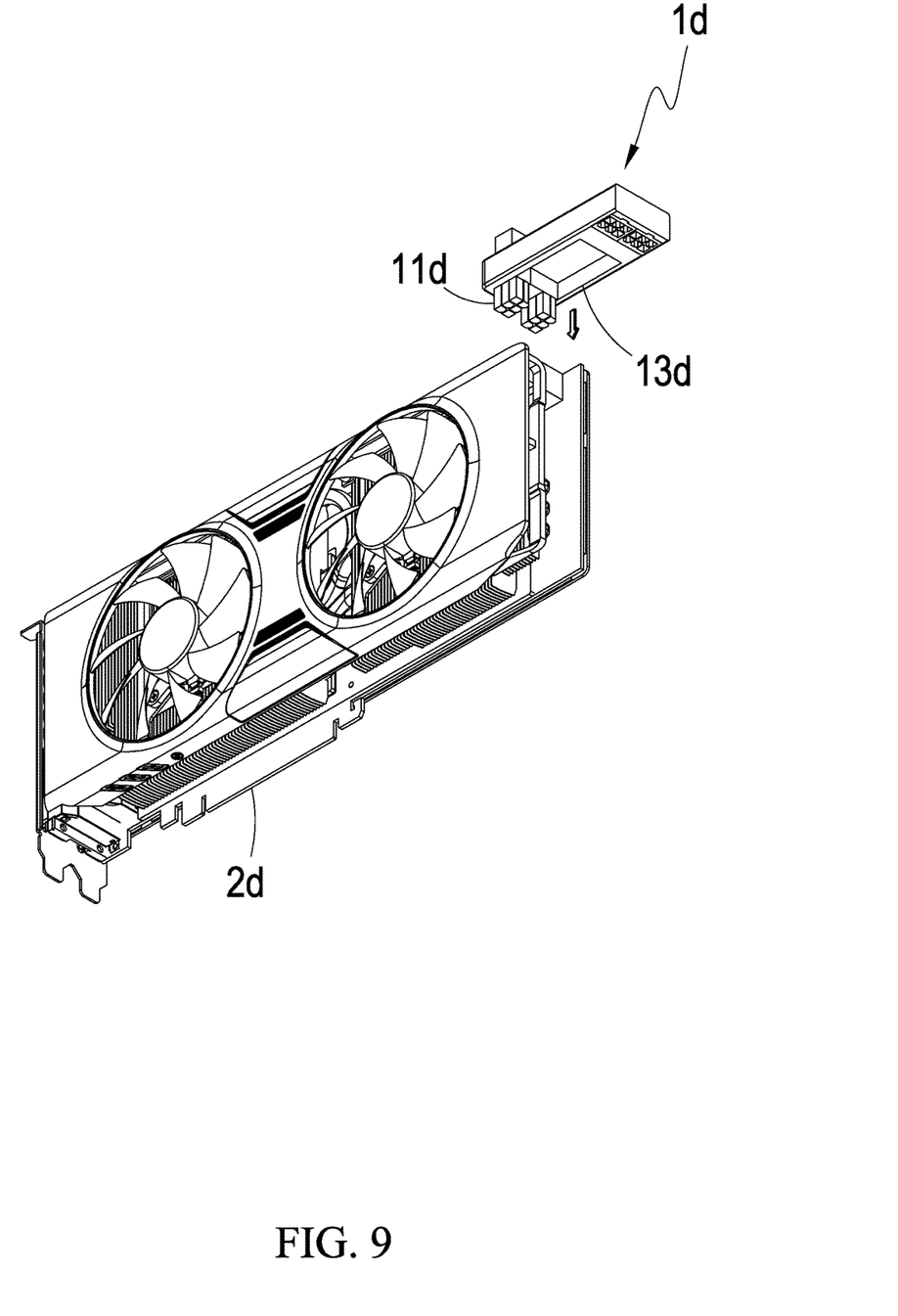
FIG. 9 is a schematic view illustrating an operation of a fifth embodiment of the present invention.

Referring to FIG. 9, in a fifth embodiment, the adaptor body 1d is provided with a connection guide slot 13d in which the first adapting portion 11d is movably arranged so that adjustment of position can be achieved with the arrangement of the connection guide slot 13d to accommodate a minor positional difference of the power connection port of a different interface card 2d, whereby the present invention is made applicable to various specifications of the interface card 2d.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. An interface card adapting device, comprising:
   an adaptor body, which is adapted to be arranged at one side of an interface card;
   a first adapting portion, which is mounted to the adaptor body and is connectable to a power connection port of the interface card; and
   a second adapting portion, which is arranged on a side of the adaptor body that is distant from the first adapting portion for replacing the power connection port so as to change current flow direction of the interface card;
   wherein the adaptor body comprises a connection guide slot formed therein for movably receiving the first adapting portion therein.

2. The interface card adapting device according to claim 1, wherein an outer housing is arranged outside the interface card.

3. The interface card adapting device according to claim 2, wherein the outer housing comprises at least one heat dissipation fan mounted thereto.

4. The interface card adapting device according to claim 2, wherein the outer housing comprises at least one slide channel section formed at one side thereof for movement of the adaptor body, the slide channel section comprising, on one side thereof, a retaining engagement section for retaining the adaptor body in position.

5. An interface card adaptation method, comprising the following steps:
   (a) positioning an adaptor body against one side of an interface card;
   (b) connecting a first adapting portion of the adaptor body to a power connection port of the interface card;
   (c) arranging second adapting portion of the adaptor body to change an output direction of the power connection port to one side that is different from the first adapting portion; and
   (d) using the second adapting portion to replace the power connection port in respect of functionality;
   wherein the adaptor body comprises a connection guide slot formed therein for movably receiving the first adapting portion therein.

6. The interface card adaptation method according to claim 5, further comprising step (a1) of receiving the interface card in an outer housing, so that the adaptor body is positioned against the side of the interface card by means of the outer housing.

7. The interface card adaptation method according to claim 6, wherein the outer housing comprises at least one heat dissipation fan mounted thereto.

8. The interface card adaptation method according to claim 6 further comprising the following steps:
   (a2) mounting the adaptor body to one side of the outer housing by means of a slide channel section; and
   (a3) retaining the adaptor body in position by means of a retaining engagement section formed at one side of the slide channel section.

* * * * *